United States Patent
Hosoya

[11] Patent Number: 5,921,639
[45] Date of Patent: Jul. 13, 1999

[54] BRAKE PRESSURE CONTROL DEVICE

[75] Inventor: Yukio Hosoya, Hamakita, Japan

[73] Assignee: Nisshinbo Industries Inc., Tokyo, Japan

[21] Appl. No.: 08/784,896

[22] Filed: Jan. 16, 1997

[30] Foreign Application Priority Data

Jan. 22, 1996 [JP] Japan ..................... 8-027327

[51] Int. Cl.$^6$ .............. B60T 13/66; F15B 13/08
[52] U.S. Cl. .................. 303/119.2; 303/113.1; 303/119.3
[58] Field of Search .............. 303/119.2, 119.1, 303/113.1, 119.3, DIG. 10; 439/76.1, 76.2, 672, 722; 137/884, 596.17, 315; 251/129.15, 129.11; 336/192; 335/202, 260, 278; 29/890.124

[56] References Cited

U.S. PATENT DOCUMENTS

5,374,114  12/1994  Burgdorf et al. ................ 303/119.2

Primary Examiner—Douglas C. Butler
Attorney, Agent, or Firm—Nikaido, Marmelstein, Murray & Oram LLP

[57] ABSTRACT

A brake pressure control device in which the connecting segments of the hydraulic control unit and the electronic control unit need not be precisely aligned relative to each other. It includes an electronic control unit (40), and a hydraulic control unit (10) containing at least one solenoid valve which is activated by electrical signals from the electronic control unit to control the brake pressure; wherein the coil components (30) of the solenoid valves are connected to the electronic control unit by a conductor (35), and the coil components (30) are fitted over the axially-protruding components of the solenoid valves protruding out of the housing of the hydraulic control unit.

11 Claims, 8 Drawing Sheets

BRAKE PRESSURE CONTROL DEVICE

BACKGROUND OF THE INVENTION

This invention relates to a vehicle brake pressure control device and more specifically, relates to a brake pressure control device that can be provided for an antilock brake system (ABS) that prevents the wheels from locking, a traction control system (TCS), an electronic braking distribution device (EBD), a suspension control device, an automatic transmission pressure control device, and other electronic control systems.

In one conventional brake pressure control device, the coil components of the solenoid valves are arranged inside the casing of an electronic control unit (ECU). The ECU is connected so as to be detachable to a hydraulic control unit (HCU). (See, for example, Unexamined Japanese Patent Application Publication No. Heisei 6(1994)-298059.).

In another brake pressure control device, the solenoid valve components are mounted on the HCU, and electrical connectors to interlock with the coil components are provided on the ECU. The ECU and HCU are connected so as to be detachable by means of the electrical connectors. (See, for example, Unexamined Japanese Patent Application Publication No. Heisei 6(1994)-183322.).

However, these conventional devices have the following problems.

In either case, unless the interlocking components between the HCU and the ECU are aligned precisely, the two units may not engage. The interlocked segment may crack under a load. A bad electrical connection could occur. In order to minimize the fluctuation in performance arising from the tolerance in the relative positions of the HCU and ECU, a very complex structure has been devised. This increases the number of assembly processes to be managed.

In the device where the solenoid valve coil components are arranged inside the casing of the ECU unit, the ECU can only be mounted in one position relative to the HCU in which case there can be no flexibility as to the layout for mounting the device in the vehicle. This same lack of flexibility in mounting also arises in the other device that uses a connector.

OBJECTS AND SUMMARY OF THE INVENTION

It is an object of this invention to provide a brake pressure control device in which the HCU and ECU are detachable, but the connecting segments of the two devices need not be aligned precisely relative to each other.

A further object of this invention is to provide a brake pressure control device in which the HCU and ECU are detachable with a high degree of freedom as to the position in which the ECU is mounted relative to the HCU.

Another object of this invention is to provide an inexpensive, highly reliable brake pressure control device in which the HCU and ECU are detachable but requires no relay connector nor complex electrical connection.

It is a still further object of this invention to provide a brake pressure control device in which the HCU and ECU are easily detachable, and the coils of the solenoid valve are securely mounted to the HCU unit.

This invention is a brake pressure control device comprising an electronic control unit, and a hydraulic control unit containing at least one solenoid valve which is operated by electrical signals from said electronic control unit to control the brake pressure. The coil component of the solenoid valve is provided exterior to the casing of the electronic control unit and is connected to the electronic control unit by a conductor. The axially-protruding component of the solenoid valve protrudes out of the housing of the hydraulic control unit. The coil component is fitted to the axially-protruding component so as to be detachable. Moreover, the coil component is housed inside a coil holder and a groove is formed around the end of the axially-protruding component. The coil holder is fitted over the axially-protruding component and a retaining ring is fitted into the groove to attach the coil holder to the housing.

Also, an elastic buffer can be arranged between the housing and the coil holder. The retaining ring is fitted into the groove so as to compress the elastic buffer, thereby attaching the coil holder to the housing. In another way, the coil component is housed inside the coil holder by an elastic buffer, and the retaining ring is fitted into the groove so as to compress the elastic buffer thereby attaching the coil holder to the housing.

Alternatively, the coil component is housed inside the coil holder, a plate spring is affixed to the housing, and the coil holder is secured to the housing by the pressure of the plate spring. In another way, the coil component is housed inside the coil holder, the plate spring is sandwiched between and affixed in position by the housing and the casing of the electronic control unit, and the coil holder is secured to the housing by the pressure of the plate spring.

Further, in the brake pressure control device of this invention, the conductor portion is connected electrically to the coil component of the solenoid valve. For this, one end of the conductor portion is connected electrically to the printed circuit board of the electronic control unit, and the other end of the conductor portion passes out of the casing of the electronic control unit and is connected to the coil component. The conductor portion is fabricated from electrical wires for automobile use.

Moreover, in the brake pressure control device of this invention, the coil holder is comprised of a cup-shaped yoke ring and a yoke provided in the large-diameter opening of the yoke ring. Alternatively, the coil holder is comprised of a cup-shaped yoke ring.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF PREFERRED EMBODIMENTS

Various embodiments of the present invention are explained next with reference to the attached diagrams.

Figure 1A:
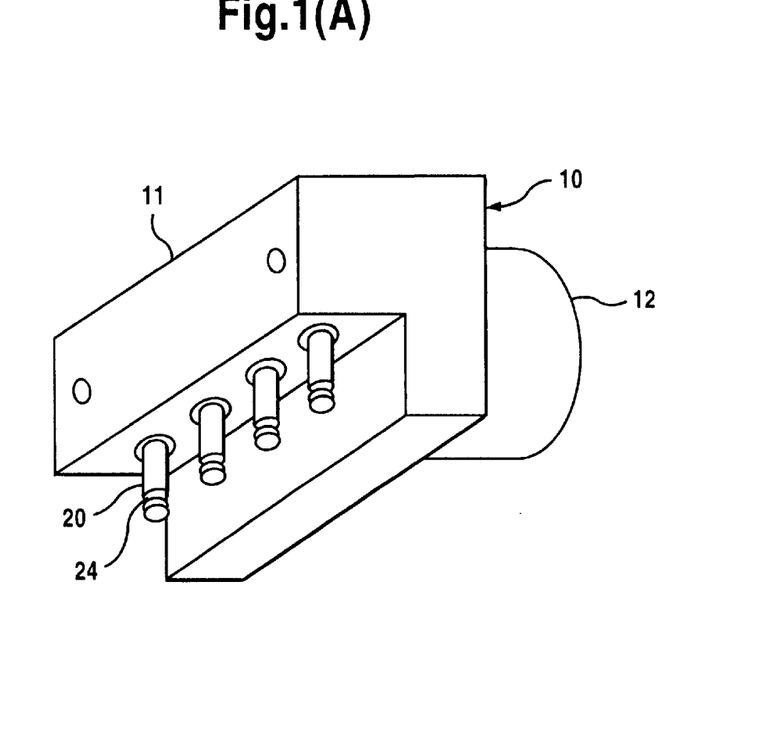
FIGS. 1(A) and 1(B) illustrate the two detachable units of a brake pressure control device according to the present invention.
Figure 1B:
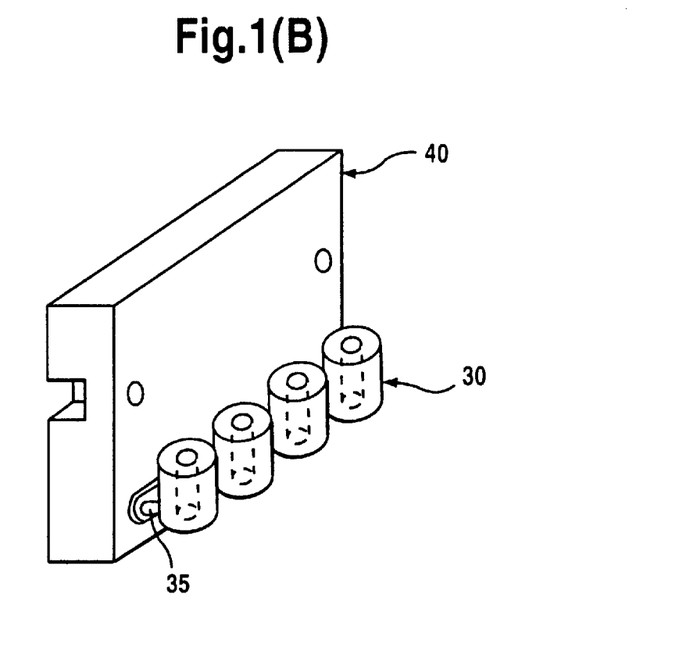
Figure 2:
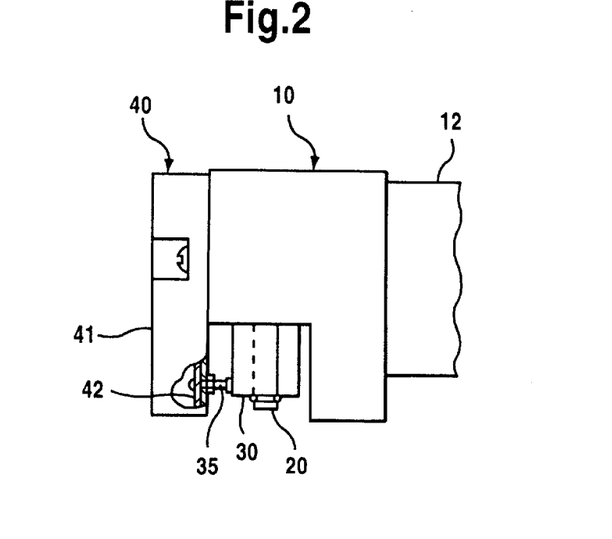
FIG. 2 illustrates the connection of the two detachable units shown in FIG. 1.

FIGS. 1(A), 1(B), and FIG. 2 illustrate the overall configuration of one example of the brake pressure control device of the present invention which includes a hydraulic control unit (HCU) 10, a plural number of the pressure-bearing axially-protruding components 20 of the solenoid valves (hereinafter the axially-protruding component), a plural number of coils (components of the solenoid valves, hereinafter called coil components 30), and an electronic control unit (ECU) 40. The coil components 30 are fitted over the axially-protruding components 20 protruding from the housing 11 of the HCU 10 such that the HCU 10 and ECU 40 are linked electromagnetically to form an integrated unit.

This embodiment is characterized by a configuration in which the coil components 30 are connected to the ECU 40 by a conductor portion 35, and the HCU 10 and ECU 40 are detachable from each other.

The HCU 10 includes a housing 11. A motor 12 is connected on the back face of the housing. A plural number of solenoid valves are mounted on the inside of the housing. A hydraulic pump, operated by the motor 12, and a plural number of fluid ducts are also bored inside the housing 11. A port to connect the brake line from the master cylinder is bored on the top face of the HCU, as are ports to connect the brake lines to each wheel.

Figure 3:
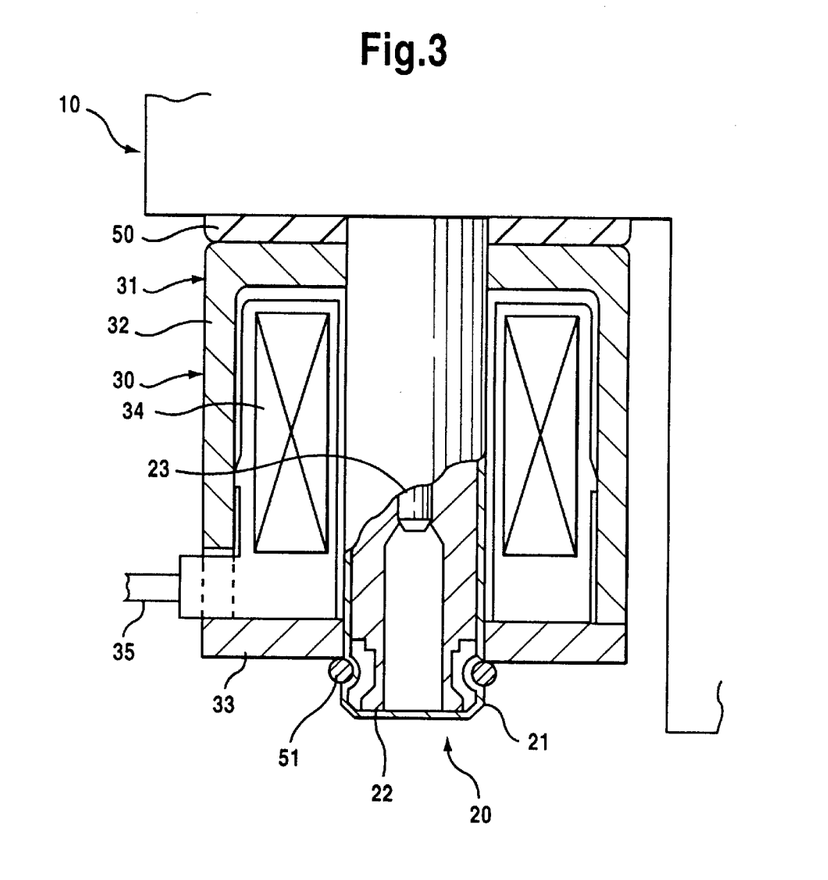
FIG. 3 illustrates an arrangement of the coil component fitted over the axially-protruding component.

FIG. 3 illustrates an example of the axially-protruding component 20 of a solenoid valve. The axially-protruding component 20 comprises a cylindrical sleeve 21, an armature 22 housed inside the sleeve, and a plunger 23 arranged in the center of the armature. When the coil component 30 is energized, the armature 22 and the valve plunger 23 slide upon receipt of the magnetic force to open or to close the fluid ducts. The fluid ducts are closed when the coil component of a normally-open solenoid valve is energized, and are opened in a normally-closed solenoid valve. The basic structural components of both valves are similar.

The coil component 30 of a solenoid valve comprises a coil holder 31, and a coil 34 comprised of wires wound around a bobbin, provided inside the holder. The coil holder 31 comprises a yoke ring 32 and a yoke 33. Both ends of the coil wires are connected to one end of a conductor portion 35. The other end of the conductor portion is connected to the ECU 40. A flexible conductor such as electrical wires used in automobiles, can be used as the conductor portion 35.

The ECU 40 includes a casing 41 fabricated from a resin, and a printed circuit board 42 mounted inside the casing. Control circuits are formed on the printed circuit board. The conductor portion 35 is connected to the circuit terminals that energize the solenoid valve coil 30.

Next, the connection of the coil component and the axially-protruding component is explained.

Figure 4:
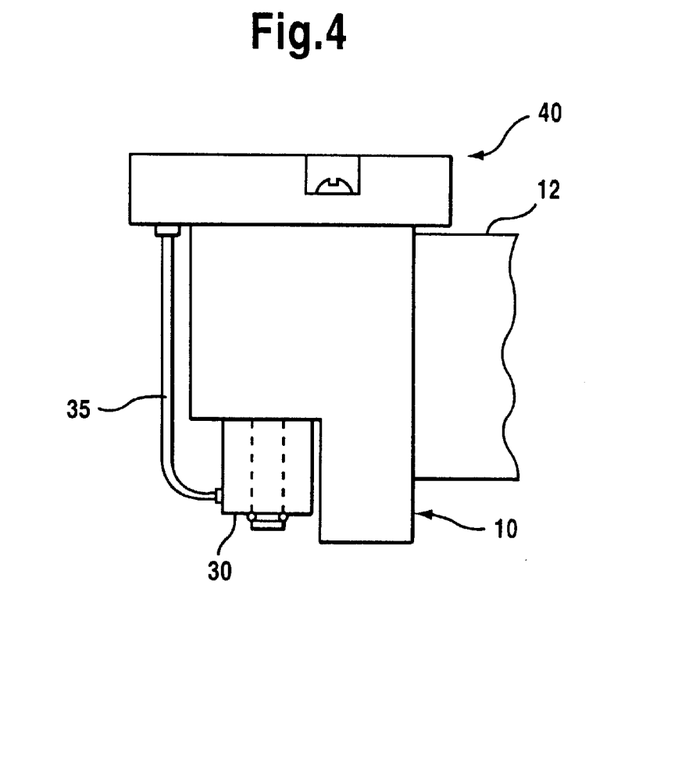
FIG. 4 illustrates an arrangement of the hydraulic control unit connected to the electrical control unit.
Figure 5:
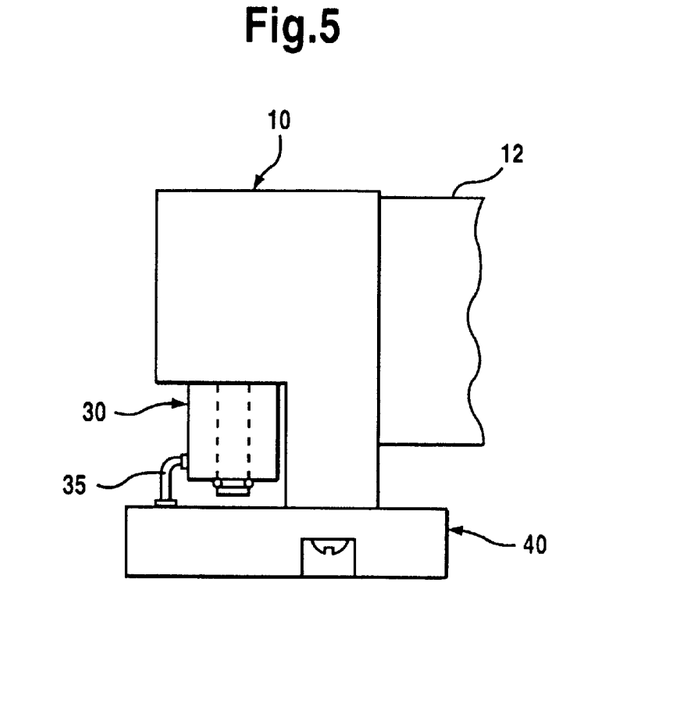
FIG. 5 illustrates another arrangement of the hydraulic control unit connected to the electrical control unit.

The coil components 30 are arranged exterior to the casing 41 of the ECU, and are connected by the conductor portion 35, hence the HCU 10 and the ECU 40 can be set at any arbitrary position relative to each other. For example, as shown in FIG. 2, the ECU 40 can be affixed with screws or similar hardware to the opposite face of the HCU 10 on which the motor 12 is mounted. Or, as shown in FIG. 4 or FIG. 5, the ECU 40 can be screwed or otherwise affixed to the bottom or upper face respectively of the HCU 10.

In any of these cases, the coil components 30 are connected by the conductor portion 35 and are not fixed to the ECU 40, wherein the components 30 can be fitted over the axially-protruding components 20 with a large degree of freedom.

Figure 6:
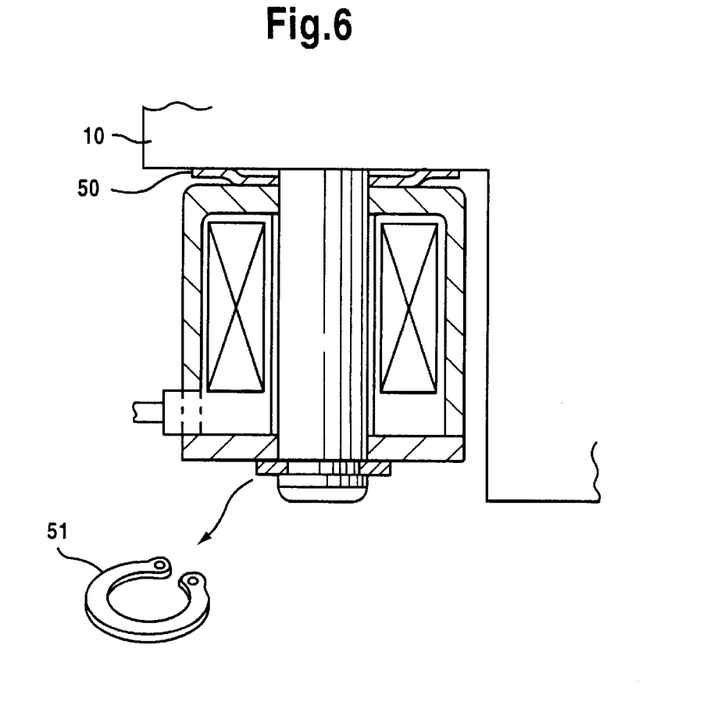
FIG. 6 illustrates another arrangement of the coil component fitted over the axially-protruding component.
Figure 7:
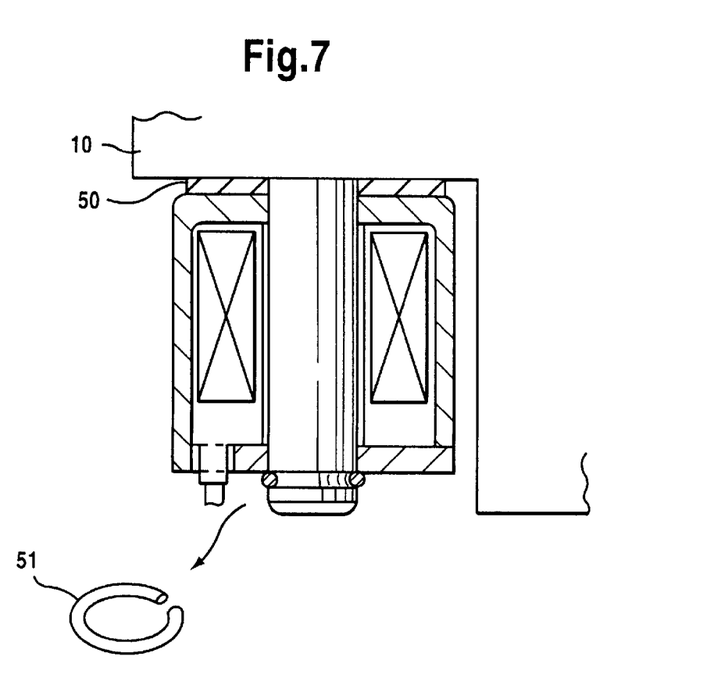
FIG. 7 illustrates another arrangement of the coil component fitted over the axially-protruding component.

As shown in FIG. 3, or in FIGS. 6–7, to fit an axially-protruding component 20 into the coil component 30, an elastic buffer 50 is inserted between the HCU 10 and the coil component 30. The elastic buffer 50 can be made of any elastic material such as a spring or rubber.

A peripheral groove 24 is formed around the end of the axially-protruding component 20. The coil component 30 is fitted over the axially-protruding component 20, the elastic buffer 50 is compressed, and a retaining ring 51 is fitted around the groove 24. The retaining ring 51 can be of a variety of shapes, as shown for example in FIG. 6 or FIG. 7.

Figure 8:
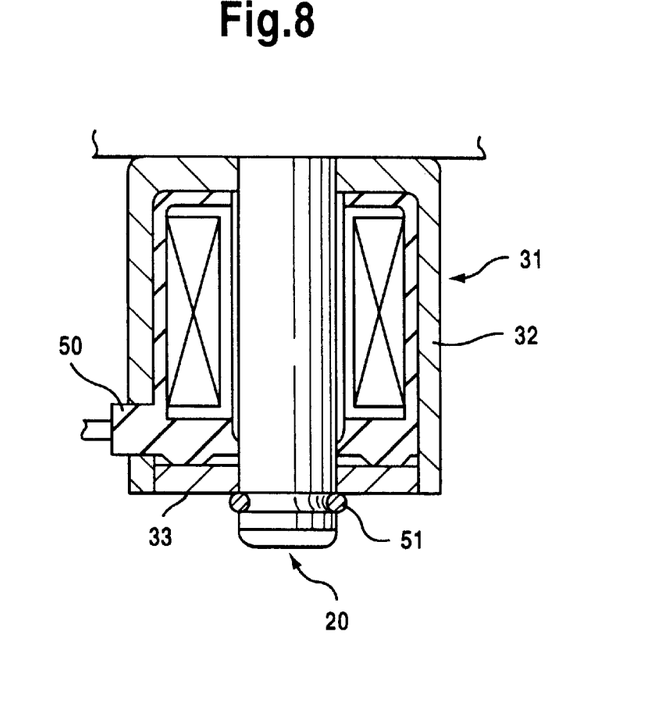
FIG. 8 illustrates another arrangement of the coil component fitted over the axially-protruding component.
Figure 9:
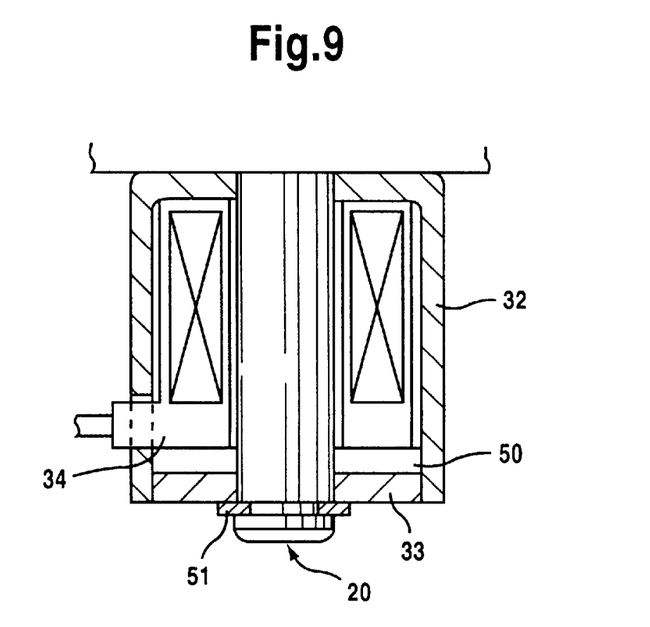
FIG. 9 illustrates another arrangement of the coil component fitted over the axially-protruding component.
Figure 10:
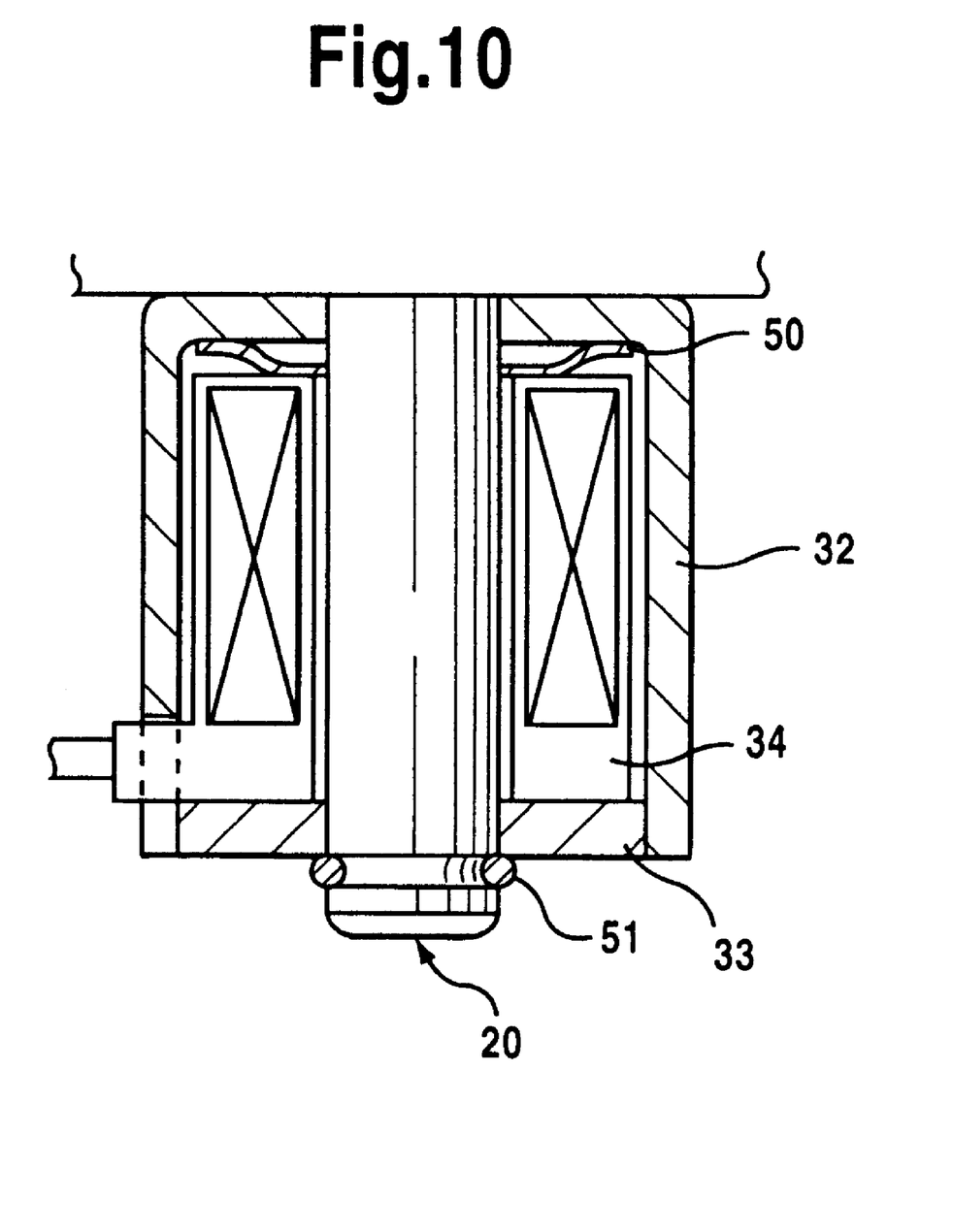
FIG. 10 illustrates another arrangement of the coil component fitted over the axially-protruding component.

Other configurations are possible as shown in FIGS. 8–10, wherein an elastic buffer 50 is set inside the coil holder 31, and the yoke 33 is laid inside the yoke ring 32. That is, as shown in FIG. 8, an elastic buffer 50 made of rubber is set around the circumference of the coil 34, or as shown in FIG. 9 and FIG. 10, a rubber or spring can be placed below or above the coil 34 respectively. Then the yoke 33 is pressed into the yoke ring 32, the elastic buffer 50 is compressed, and the retaining ring 51 is fitted into the groove 24 to affix the coil component 30 to the HCU 10.

Figure 11:
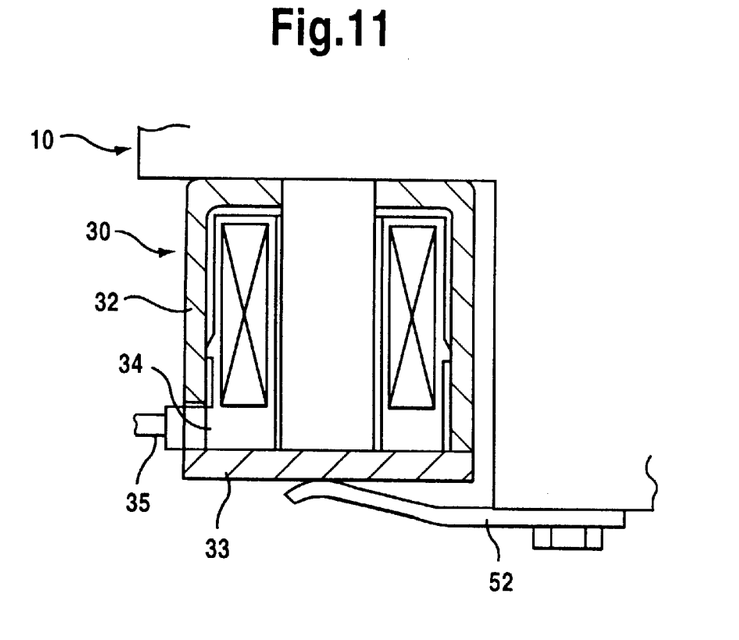
FIG. 11 illustrates another arrangement of the coil component fitted over the axially-protruding component.
Figure 12:
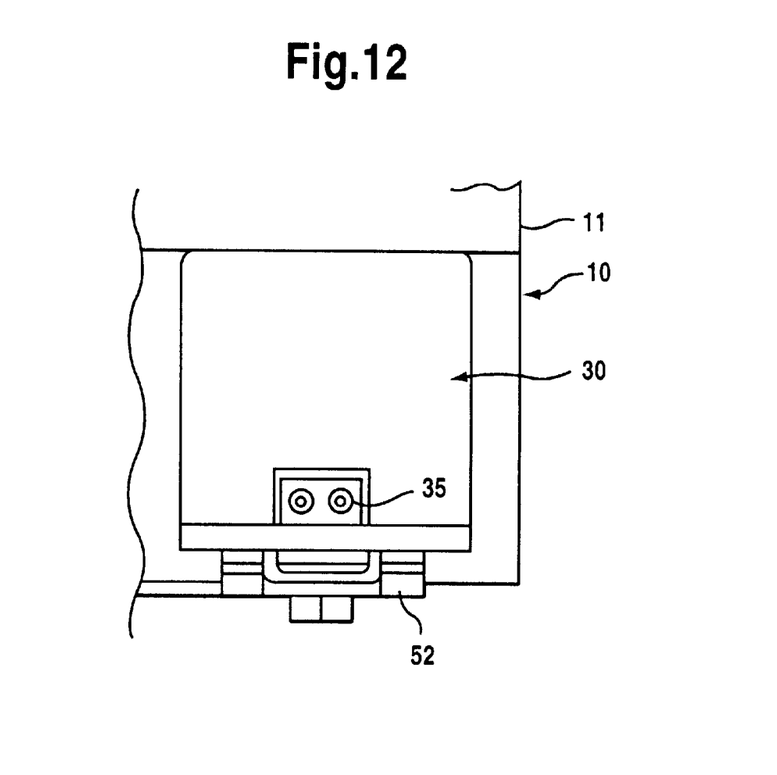
FIG. 12 illustrates another arrangement of the coil component fitted over the axially-protruding component.

As shown in FIGS. 11–12, other methods of mounting the coil component are available. A plate spring 52 or other elastic material can be affixed to the housing 11 of the HCU 10, the coil component 30 is fitted over the axially-protruding component 20, then the coil component 30 is affixed by the spring force of the plate spring 52. FIG. 12 is a view from the left of FIG. 11.

Figure 13:
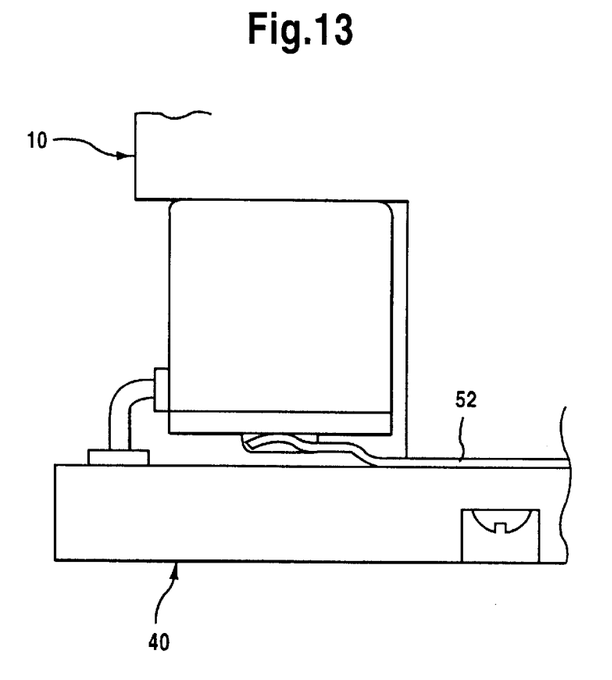
FIG. 13 illustrates another arrangement of the coil component fitted over the axially-protruding component.

Alternatively, as shown in FIG. 13, the plate spring 52 is affixed between the HCU 10 and the ECU 40, and the coil component 30 is affixed by the spring force of the plate spring 52.

Figure 14:
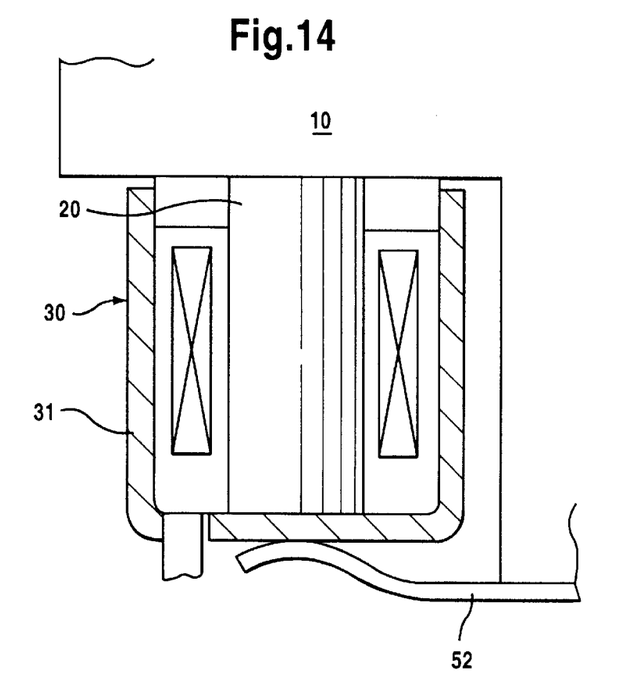
FIG. 14 illustrates another arrangement of the coil component fitted over the axially-protruding component.

As shown in FIG. 14, an alternative configuration of coil holder can be used. The coil holder 31 need not be comprised of a yoke 33 and yoke ring 32 as shown in FIG. 3. As shown in FIG. 14, a cup-shaped yoke ring, in which the yoke is integrally formed, can be used. This configuration has the advantage of reducing the number of parts.

This invention provides certain particular advantages.

The coil component of the solenoid valve is mounted exterior to the ECU and can be connected electrically to the ECU by a conductor portion. This allows a greater degree of freedom as to the relative positions of the ECU and the HCU for assembly, and the connecting segments of the two units need not be aligned with great precision.

The coil component of the solenoid valve can be mounted on the exterior of the ECU and can be connected electrically to the ECU by a conductor portion. This eliminates the need for a relay connector or complex electrical connection, thus increasing the reliability of the device but at lower cost.

The coil component can be secured tightly to the HCU by a retaining ring fitted into a groove around the axially-protruding component. This also facilitates the attachment and detachment of the two units.

The device can be readily compatible to a change in the number of solenoid valves. For example, if fewer valves are used, the same ECU unit can still be used by simply sealing the cavity for the conductor portion in the ECU unit with a rubber plug or similar material.

It is readily apparent that the above-described has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A brake pressure control device comprising an electronic control unit having a casing and producing electrical signals, a hydraulic control unit including a housing and at least one solenoid valve which is operated by said electrical signals from said electronic control unit to control the brake pressure, a coil component for each solenoid valve, each coil component being provided and remaining exterior to the casing of the electronic control unit and exterior to the housing of the hydraulic control unit, a conductor portion electrically connecting each coil component to said electronic control unit, and an axially-protruding component of said solenoid valve protruding out of the housing of said hydraulic control unit, said coil component being fitted over said axially-protruding component so as to be detachable and said coil component being connected to said conductor portion.

2. The brake pressure control device as claimed in claim 1, wherein each said coil component further includes a coil holder, and a coil housed inside said coil holder, and wherein a groove is formed around the end of said axially-protruding component, said coil holder being fitted over said axially-protruding component; and each said coil component still further includes a retaining ring fitted into said groove to attach said coil holder to said housing.

3. A brake pressure control device as claimed in claim 2, further comprising an elastic buffer arranged between said housing and said coil holder, and wherein said retaining ring is fitted into said groove so as to compress said elastic buffer thereby attaching said coil holder to said housing.

4. A brake pressure control device as claimed in claim 2, wherein said coil is housed inside said coil holder by an elastic buffer, and said retaining ring is fitted into said groove so as to compress said elastic buffer thereby attaching said coil holder to said housing.

5. A brake pressure control device as claimed in claim 1, wherein said coil component includes coil holder, a plate spring is affixed to said housing, and said coil holder is secured to said housing by the pressure of said plate spring.

6. A brake pressure control device as claimed in claim 1, wherein said coil component includes a coil holder, a plate spring is sandwiched between and affixed in position by said housing and the casing of said electronic control unit, and said coil holder is secured to said housing by the spring force of said plate spring.

7. A brake pressure control device as claimed in any one of claims 1–6, wherein said conductor portion is connected electrically to the coil component, and one end of said conductor is connected electrically to a printed circuit board of said electronic control unit, and the other end of said conductor passes through the casing of said electronic control unit.

8. A brake pressure control device as claimed in claim 7, wherein said conductor portion is fabricated from electrical wires for automobile use.

9. A brake pressure control device as claimed in any one of claims 2–6, wherein said coil holder comprises a cup-shaped yoke ring and a yoke provided in a large-diameter opening of said yoke ring.

10. A brake pressure control device as claimed in any one of claims 2–6, wherein said coil holder comprises a cup-shaped yoke ring.

11. A brake pressure control device as claimed in any one of claims 1–6, wherein said conductor portion is fabricated from electrical wires for automobile use.

* * * * *